(12) United States Patent
Gibson et al.

(10) Patent No.: US 9,864,796 B2
(45) Date of Patent: Jan. 9, 2018

(54) DATABASES FROM MODELS

(75) Inventors: William E. Gibson, Woodinville, WA (US); Keith W. Short, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 676 days.

(21) Appl. No.: 12/491,042

(22) Filed: Jun. 24, 2009

(65) Prior Publication Data

US 2010/0332548 A1    Dec. 30, 2010

(51) Int. Cl.
*G06F 17/30*    (2006.01)

(52) U.S. Cl.
CPC .. *G06F 17/30607* (2013.01); *G06F 17/30557* (2013.01); *G06F 17/30587* (2013.01)

(58) Field of Classification Search
CPC ........ G06F 17/30607; G06F 8/30; G06F 8/34; G06F 17/30569; G06F 17/30557; G06F 17/30587
USPC .......................... 707/802, 803, 804, 810, 756
See application file for complete search history.

(56) References Cited

U.S. PATENT DOCUMENTS

| | | | |
|---|---|---|---|
| 5,499,371 A * | 3/1996 | Henninger et al. ..... | 707/999.102 |
| 5,592,668 A * | 1/1997 | Harding et al. ........ | 707/999.002 |
| 5,857,197 A * | 1/1999 | Mullins ............. | G06F 17/30607 |
| | | | 707/999.102 |
| 6,199,195 B1 * | 3/2001 | Goodwin et al. ......... | 707/999.1 |
| 6,374,252 B1 * | 4/2002 | Althoff et al. | |
| 6,611,843 B1 * | 8/2003 | Jacobs .................. | 707/999.102 |
| 7,031,956 B1 * | 4/2006 | Lee ................... | G06F 17/30595 |
| | | | 707/999.102 |
| 7,149,730 B2 * | 12/2006 | Mullins ............. | G06F 17/30607 |
| | | | 707/999.003 |
| 7,299,223 B2 * | 11/2007 | Namait et al. ................ | 707/600 |
| 7,373,596 B2 * | 5/2008 | Hu et al. ........................ | 715/239 |
| 7,725,883 B1 * | 5/2010 | Nylander et al. ............. | 717/139 |
| 7,739,670 B2 * | 6/2010 | Gutfleisch et al. ........... | 717/136 |
| 7,877,421 B2 * | 1/2011 | Berger et al. ................. | 707/809 |
| 8,615,729 B2 * | 12/2013 | Cornell et al. ................ | 717/104 |
| 8,869,098 B2 * | 10/2014 | Elaasar et al. ................ | 717/104 |

(Continued)

FOREIGN PATENT DOCUMENTS

WO    WO2008155110 A2    2/2008

OTHER PUBLICATIONS

Falda, Grzegorz, et al., "Object Oriented Database Prototype as a Model Execution Engine for Executable UML", Feb. 2008, 10 pages.

(Continued)

*Primary Examiner* — Vincent F Boccio
(74) *Attorney, Agent, or Firm* — Workman Nydegger

(57) ABSTRACT

One or more model elements may be extracted from a model. Coding patterns may be generated based on the extracted model elements. The coding patterns may be translated into statements, such as Structured Query Language (SQL) statements, which may be executed to instantiate at least a portion of a database. The database may be used to store, edit and/or query data that is arranged according to the model. The model may define a modeling language specification, such that the stored data may define various models that comply with the modeling language specification. Accordingly, the database may be queried to analyze the contents of the modeling-language compliant models.

19 Claims, 7 Drawing Sheets

(56) References Cited

U.S. PATENT DOCUMENTS

| | | | |
|---|---|---|---|
| 2003/0208505 A1* | 11/2003 | Mullins | G06F 17/30607 707/999.102 |
| 2006/0122973 A1* | 6/2006 | Berg et al. | 707/3 |
| 2007/0180424 A1 | 8/2007 | Kazakov et al. | |
| 2007/0226196 A1* | 9/2007 | Adya et al. | 707/3 |
| 2007/0226203 A1* | 9/2007 | Adya et al. | 707/4 |
| 2008/0209390 A1 | 8/2008 | Dutta et al. | |
| 2009/0007084 A1 | 1/2009 | Conallen et al. | |

OTHER PUBLICATIONS

The Middleware Company, "Model Driven Development for J2EE Utilizing a Model Driven Architecture (MDA) Approach" Productivity Analysis, MDA Productivity Case Study, Jun. 2003, 18 pages.

The Coffee Desk, 5 Minute News for Geeks, by Geeks, "Microsoft's new 'M' programming language" Oct. 2008, 6 pages.

Worthington, David, SDTimes, "Microsoft makes 'M' interoperable with OMG-compliant software", Apr. 2009, 3 pages.

Kovse, Jernej, et al., "Generic XMI-Based UML Model Transformations", Lecture Notes in Computer Science; vol. 2425 archive Proceedings of the 8th International Conference on Object-Oriented. pp. 192-198 Year of Publication: 2002.

Selic, Bran, "A Systematic Approach to Domain-Specific Language Design Using UML", Proceedings of the 10th IEEE International Symposium on Object and Component-Oriented Real-Time Distributed Computing (ISORC'07), 2007, 8 pages.

* cited by examiner

```
People : {
    Id : Integer64 = AutoNumber();
    Name : Text#100;
} * where identity Id;

Friends : {
    BasePerson : People;
    SocialWebSite : Text#250;
} * where identity BasePerson;

Customers : {
    BasePerson : Integer64;
    Company : Text?;
} * where
    identity BasePerson,
    item.BasePerson in People.Id;

ForeignCustomers : {
    BaseCustomer : Customers;
    Country : Text#30;
} * where identity BaseCustomer;
```

*FIG. 6*

```
People : {
    Id : Integer64 = AutoNumber();
    NominalType :
        "ForeignCustomer",
        "DomesticCustomer",
        "Friend",
        "Contractor",
        "Employee"
    ;
    Name : Text#100;
} * where identity Id;

Friends : {
    BasePerson : People;
    SocialWebSite : Text#250;
} * where
    identity BasePerson,
    item.BasePerson.NominalType == "Friend";
```

*FIG. 7*

```
People : {
    Id : Integer64 = AutoNumber();
    NominalType : NominalPersonTypes;
    Name : Text#100;
} * where identity Id;

Friends : {
    BasePerson : People;
    SocialWebSite : Text#250;
}* where
    identity BasePerson,
    item.BasePerson.NominalType.Value ==
"Friend";

NominalPersonTypes : {
    Value : Text#20;
} * where identity Value {
    {Value = "ForeignCustomer"},
    {Value = "DomesticCustomer"},
    {Value = "Friend"},
    {Value = "Contractor"},
    {Value = "Employee"}
}
```

*FIG. 8*

```
People :
{
    Id : Integer64 = AutoNumber();

NominalType : {
            "ForeignCustomer",
            "DomesticCustomer",
            "Friend",
            "Contractor",
            "Employee"
        };

Name : Text#100;

SocialWebSite : (Text#250)? where
            // Only valid for friends; optional
            (value == null) || (value != null && NominalType ==
    "Friend");

Company : (Text#100)? where
            // value optional only if not a customer
            ((value == null) && (!(NominalType == "ForeignCustomer"
    || NominalType == "DomesticCustomer"))
            ||
            // value is mandatory for customers
            (value != null) && (NominalType == "ForeignCustomer" ||
                                NominalType == "DomesticCustomer"));

Country : (Text#30)? where
            // Only valid for foreign customers; optional
            (value == null) || (value != null && NominalType ==
    "ForeignCustomer");

OfficeLocation : (Text#50)? where
            //Only valid for colleagues; optional
            (value == null) || (value != null && (NominalType ==
    "Contractor" ||
                                                  NominalType ==
    "Employee"));

IsIndependentContractor : Logical? where
            //Only valid for contractors, optional
            (value == null) || (value != null && NominalType ==
    "Contractor");
}* where identity Id;
```

*FIG. 9*

```
type Person
{
    Id : Integer64 = AutoNumber();
    Name : Text#100;
} type Customer : Person
{
    Company : Text#100?;
}

ForeignCustomers :
(
    Customer &
    {
        Country : Text#30;
    }
)* where identity Id;

DomesticCustomers :
(
    Customer &
    {
        SalesRegion : Text#50;
    }
)* where identity Id;
```

DATABASES FROM MODELS

CROSS-REFERENCE TO RELATED APPLICATIONS

Not Applicable.

BACKGROUND

1. Background and Relevant Art

Modeling languages such as the Unified Modeling Language (UML) enable the creation of an abstract representation of information in some domain of interest. Common in many of these languages are notions of Class or Entity Type, which are used to describe objects in the domain that have common characteristics. Using the conventions of these languages, complex class or entity models involving many inter-related classes or entity types can be constructed. These models provide a way to reason about information that is important in the domain and how it is structured and constraints that apply to it. It is common to define such a model as a means to communicate an understanding of the domain to others, for example to confirm with domain experts that the kinds of information and their relationships represented in the model are an accurate representation of the equivalent concepts in the real domain. It is common to create such a model that is scoped to the information that is to be stored in a database prior to designing the schema or structure of the database. Such a model is often referred to as a conceptual model because it reflects the concepts as understood by the domain users and those that plan to develop software programs that will access information from the domain in a database.

Conceptual modelling allow the modelers and domain experts to concentrate on the information the model represents rather than the details of a database design, which are not relevant to the domain users and often obscure their understanding of the information being stored. Furthermore, there are typically many different database designs possible for the same model; presenting one such design may influence the perception of the information by giving undue prominence to some parts of the data and not others and presumes a particular design early on which may not be optimal in the long run. Changing the design to improve performance then requires that domain experts, typically with little understanding of database design, have to be exposed to these changes which have no meaningful impact on their perception of the data held in the database.

Once a conceptual model has been developed and reviewed with domain experts, the information represented in the model may be used for database design. In addition, the users of the database may understand concepts and relationships from the conceptual model without needing to be familiar with the details of the storage design. Relational database systems such as SQL Server describe storage in terms of tables containing rows of data, each row comprising columns in which individual facts are stored. Database views can then be defined as part of the database schema to project an abstraction of the data in one or more tables. These views can be used to access the data in the tables. With care, a set of views can be defined which reflects the conceptual model of the data stored in the database, with a view created potentially for each important class in the original model. The arrangement of the underlying tables may however have a significant impact on the performance of applications that access the database to create, read, update or delete data in the database. The storage design can be changed to optimize the performance of the database to match the requirements of the applications and volumes of data stored. As long as the views are modified appropriately, database users and application programs written against those views are insulated from the changes to the tables, except in terms of the performance of the database. Creating and maintaining a complex database design and maintaining a stable set of views as the design is evolved over time can be a complex and error prone process involving skilled database practitioners, and is often a bottle-neck in large development projects. It is also a discipline not always followed because of the extra work involved, so many databases are rapidly developed and programmers access the database through tables or views that reflect the database design rather than the conceptual model. As a consequence, later changes to the database design may now impact users and software developers causing them to rewrite parts of applications, often at great cost. This cost often results in costly delays to software projects, or the cost of change acts as an inhibitor to change and the performance of the database is not optimized.

BRIEF SUMMARY

The present invention extends to methods, systems, and computer program products for extracting one or more model elements from a model, generating a declarative-language coding pattern based on predetermined criteria and the model elements, translating the generated coding pattern into one or more Structured Query Language (SQL) statements and instantiating at least a portion of a database by executing the SQL statements. The model may define a modeling language specification. The elements in the model may be organized into one or more generalization structures, and the extracted model elements may form part of those generalization structures.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 6 is an illustration of an exemplary coding pattern;

FIG. 7 is an illustration of an exemplary coding pattern;

FIG. 8 is an illustration of an exemplary coding pattern;

FIG. 9 is an illustration of an exemplary coding pattern;

DETAILED DESCRIPTION

Figure 1:
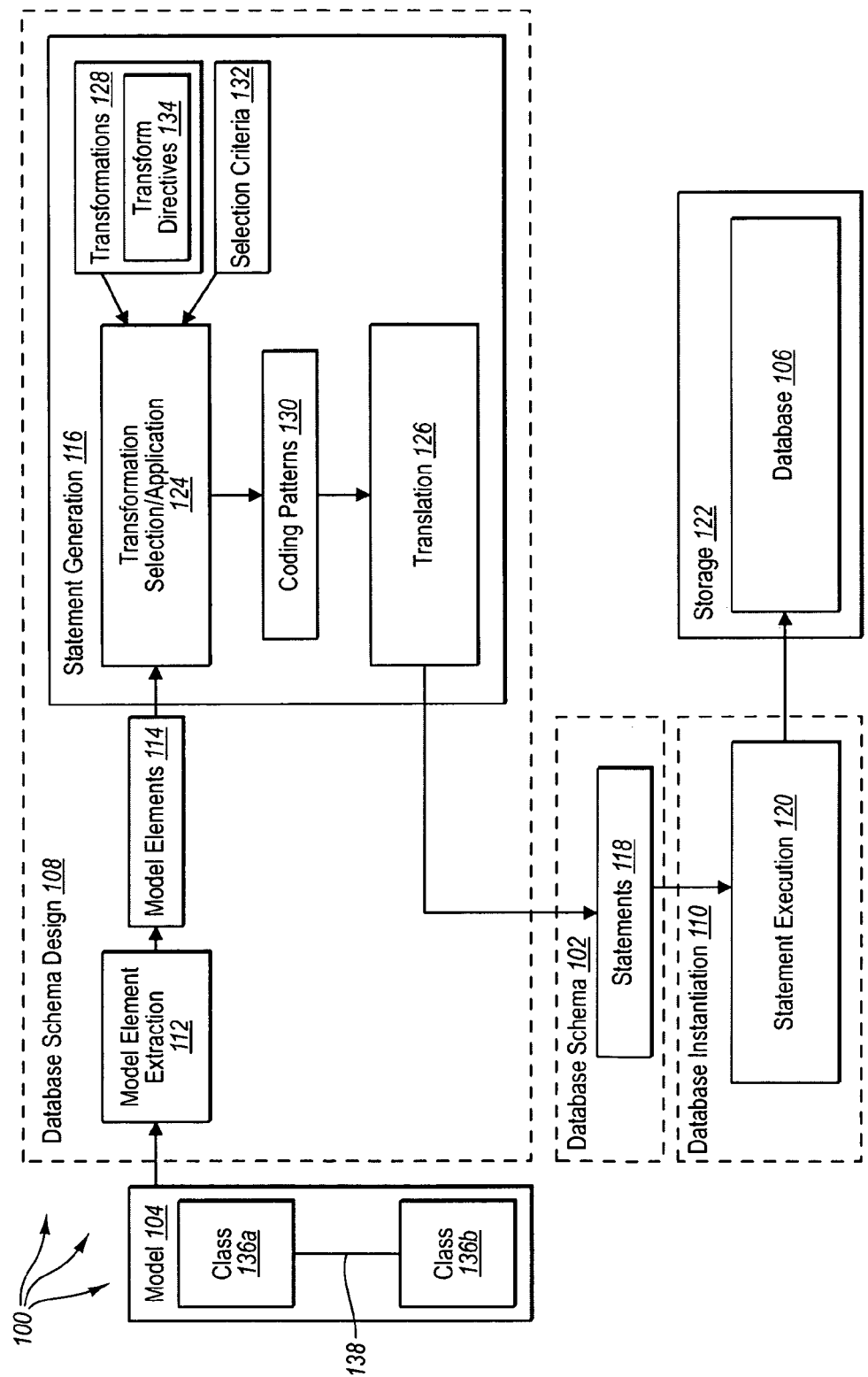
FIG. 1 illustrates an example computer architecture that facilitates designing and creating databases based on a model.

The present invention extends to methods, systems, and computer program products for extracting one or more model elements from a model, generating a declarative-language coding pattern based predetermined criteria and the model elements, translating the generated coding pattern into one or more Structured Query Language (SQL) statements and instantiating at least a portion of a database by executing the SQL statements. The model may define a modeling language specification. The elements in the model may be organized into one or more generalization structures, and the extracted model elements may form part of those generalization structures.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations (e.g., have one or more processors and system memory), including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates designing and creating databases based on a model. As depicted, computer architecture 100 includes database schema design 108, statement generation 116, database schema 102, database instantiation 110, and storage 122. Each of the depicted components is connected to one another over (or is part of) a network, such as, for example, a Local Area Network ("LAN"), a Wide Area Network ("WAN"), and even the Internet. Accordingly, each of the depicted computer systems as well as any other connected computer systems and their components can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

As shown in FIG. 1, computer architecture 100 may be configured to design a database schema 102 for a model 104 that may include one or more model elements. Computer architecture 100 may, for instance, use the model elements to design the database schema 102, which may be used to instantiate a database 106. A user may then use the database 106 to store, edit and/or query data that is arranged according to the model 104. The model 104 may, for example, be used to describe software system structure, software system behavior, software system architecture, software system artifacts, business processes, data structures, software and/or other desired information.

Figure 2:
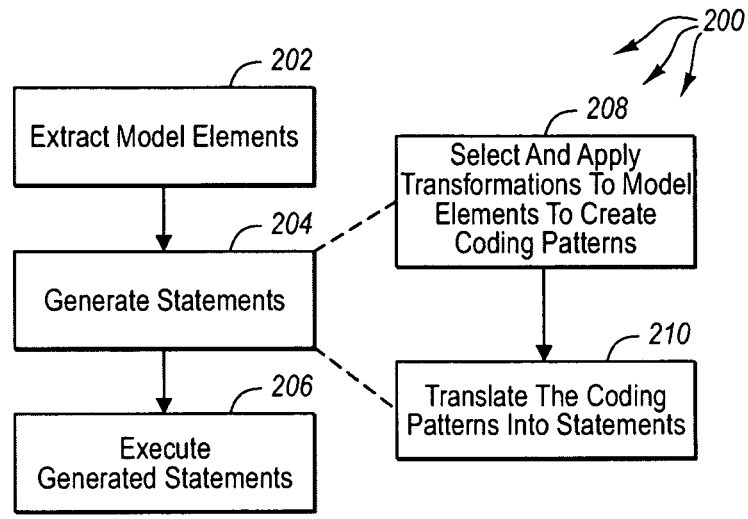
FIG. 2 is a flowchart of an exemplary method for designing and creating databases based on a model.

FIG. 2 is a flowchart of a method 200 for designing and creating databases based on a model. Method 200 will be described with respect to the components and data depicted in computer architecture 100. In further detail, the computer architecture 100 may include a database schema design portion 108 configured to design the database schema 102 and a database instantiation portion 110 configured to instantiate the database 106 according to the database schema 102. The database schema design portion 108 may include a model element extraction portion 112 that may extract model elements 114 from the model 104 (act 202). The database schema design portion 108 may also include a statement generation portion 116 that may generate statements 118 (act 204) that may form at least a portion of the database schema 102. The database instantiation portion 110 may include a statement execution portion 120 that may execute the statements 118 (act 206) to instantiate at least a portion of the database 106 according to the database schema 102.

To help generate the statements 118 (act 204), the statement generation portion 116 may include a transformation selection and application portion 124 and a translation portion 126. The transformation selection and application portion 124 may select and apply one or more transformations 128 to the extracted model elements 114 to create coding patterns 130 (act 208). The translation portion 126 may translate the coding patterns 130 (act 210) into the statements 118, which the statement execution portion 120 may then execute (act 206) to instantiate at least a portion of the database 106 according to the database schema 102.

Figure 3:
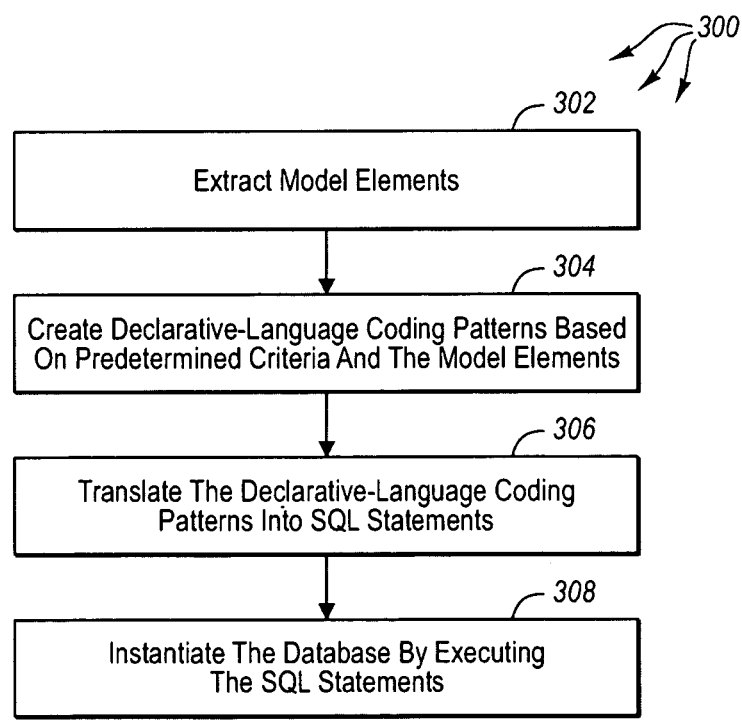
FIG. 3 is a flowchart of an exemplary method for designing and creating databases based on a model.

FIG. 3 is a flowchart of a method 300 for designing and creating databases based on a model. Method 300 is an embodiment of the method 200, which will be described with respect to the components and data depicted in computer architecture 100. In further detail, the model element extraction portion 112 may extract model elements 114 from the model 104 (act 302). The transformation selection and application portion 124 may create declarative-language coding patterns based on predetermined selection criteria 132 and the extracted model elements 114 (act 304). For instance, the transformation selection and application portion 124 may select one or more transformations 128 based on the predetermined selection criteria 132 and then apply the selected transformations to the extracted model elements 114 to create the declarative-language coding patterns. The predetermined selection criteria 132 used to select the transformations 128 may include, for example, one or more rules that can automatically determine which transformations 128 are applied to which model elements 114 and/or user-entered instructions that dictate which transformations 128 are applied to which model elements 114. The translation portion 126 may translate the declarative-language coding patterns (act 306) into a database schema including Structured Query Language (SQL) statements, such as T-SQL statements or other SQL statements. The statement execution portion 120 may then instantiate at least a portion of the database 106 according to the database schema 102 by executing the SQL statements (act 308).

In one embodiment, the model 104 may define a modeling language specification, such as Unified Modeling Language (UML) version 2 or other modeling language. Accordingly, in this embodiment, the database 106 may be used to store, edit and/or query data defining various models created in compliance with the modeling language specification. Significantly, the data stored in the database 106 may be retrieved and used to render at least a portion of a modeling-language compliant model. The modeling-language compliant model may be rendered, for example, on a display device, such as an LCD, a CRT, another type of monitor or other suitable display device. In addition, the data stored in the database 106 may be queried to ascertain the components of the modeling-language compliant model or to analyse such models, for example to determine how elements in one model may depend upon elements in another model such that the impact on other models of making a change to a model can be ascertained. The modeling-language compliant models may, for example, be used to describe software system structure, software system behavior, software system architecture, software system artifacts, business processes, data structures, software and/or other desired information In one embodiment, the elements 114 of the model 104 may be organized into one or more generalization structures, for instance, generalization hierarchies (such as an exemplary generalization hierarchy 400 shown in FIG. 4) and/or other generalization structures (such as acyclic graphs that define inheritance among various classes or entity types). The transformation selection and application portion 124 shown in FIG. 1 may create coding patterns 130 for the generalization hierarchy by selecting and applying one or more transformations 128 to the model elements 114 extracted from the generalization hierarchy. The coding patterns 130 for the generalization hierarchy may include, for example, table-per-class (TPT) coding patterns, table-per-hierarchy (TPH) coding patterns, table-per-concrete class (TPC) coding patterns and/or other suitable coding patterns.

In further detail, the generalization hierarchy 400 may include one or more classes or entity types 402, 404, 406, 408, 410, 412, 414, 416. The classes 402, 404, 406 may be abstract, and the classes 408, 410, 412, 414, 416 may be concrete.

Figure 4:
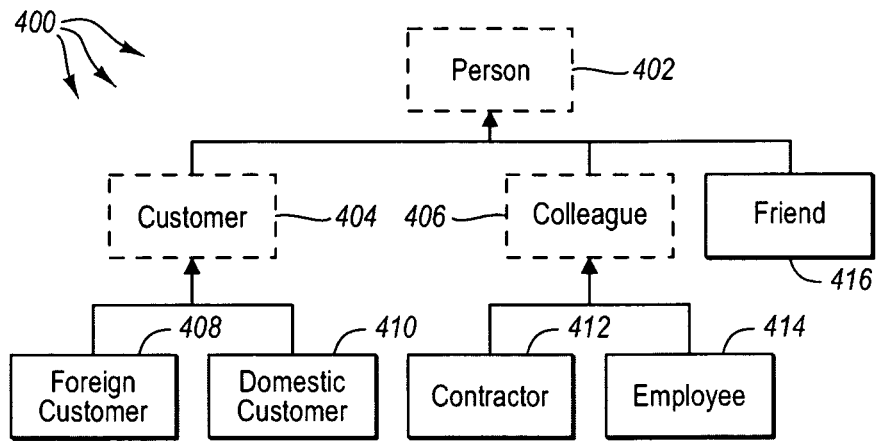
FIG. 4 is a diagram of an exemplary generalization structure.

An instance of a concrete class in a generalization hierarchy may be an instance of one or more abstract classes above it in the hierarchy. For example, as shown in FIG. 4, instances of concrete classes 408 ("Foreign Customer"), 410 ("Domestic Customer") may be instances of abstract classes 402 ("Person"), 404 ("Customer"). Instances of concrete classes 412 ("Contractor"), 414 ("Employee") may be instances of abstract classes 402 ("Person"), 406 ("Colleague"). Instances of concrete class 416 ("Friend") may be instances of abstract class 402 ("Person"). In other words, according to the generalization hierarchy 400, foreign customers and domestic customers are customers and persons; contractors and employees are colleagues and persons; and friends are persons.

Figure 5:
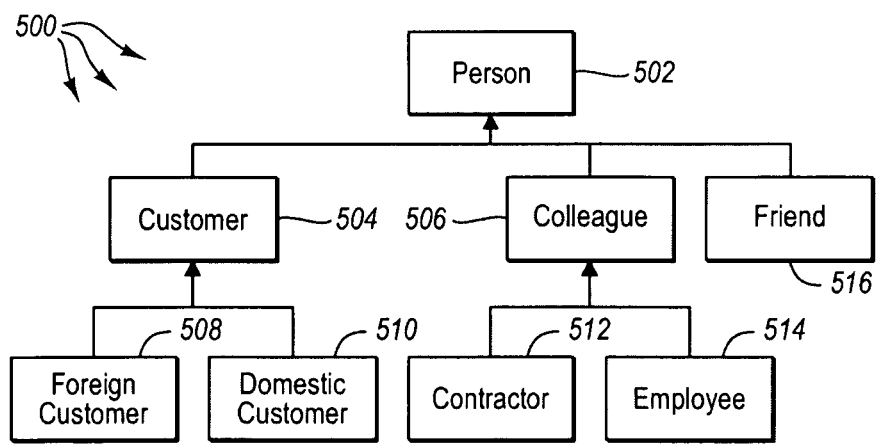
FIG. 5 is a diagram of an exemplary database based on the structure shown in FIG. 4.

In one embodiment, the transformation selection and application portion 124 shown in FIG. 1 may select and apply one or more transformations 128 to the model elements 114 from the generalization hierarchy 400 to create table-per-class coding patterns 130. The table-per-class coding patterns 130 may then be translated into the statements 118 that are executed to instantiate a database 500 shown in FIG. 5. The database 500 may include one or more tables that correspond to the classes 402, 404, 406, 408, 410, 412, 414, 416 in the generalization hierarchy 400. For example, the database may include tables 502, 504, 506, 508, 510, 512, 514, 516 that correspond to the classes 402, 404, 406, 408, 410, 412, 414, 416, respectively.

FIG. 6 illustrates a table-per-class coding pattern 600, which may be translated into statements 118 that may be executed to instantiate at least a portion of the database 500, in particular, tables 502, 504, 508, 516. As shown in FIG. 6, the coding pattern 600 may be written in a declarative language, such as the M language.

In some instances, it may be difficult to ascertain the nominal (or concrete) class of an instance included in a view or query of a database instantiated using table-per-class coding patterns 130. In such instances, the table-per-class coding patterns 130 may include an enumeration that may be used to indicate the nominal class. For example, as shown in FIG. 7, a table-per-class coding pattern 700 may include a closed enumeration 702 of the nominal classes. Also, for example, as shown in FIG. 8, a table-per-class coding pattern 800 may include an open enumeration 802 of the nominal classes.

Desirably, table-per-class coding patterns 130 may make it easy to add new extents that correspond to new classes. In addition, table-per-class coding patterns 130 may make it easy to query for all instances of an abstract class at any desired level of a hierarchy. The selection criteria 132 for table-per-class coding patterns 130 may include (1) how many concrete classes are at the various levels in a generalization hierarchy; (2) where extensibility of the generalization hierarchy is desired; (3) there are many relationships with abstract classes in the generalization hierarchy; (4) where querying of the abstract classes is desired; and/or other selection criteria.

In one embodiment, the transformation selection and application portion 124 shown in FIG. 1 may select and apply one or more transformations 128 to the model elements 114 from the generalization hierarchy 400 to create table-per-hierarchy coding patterns 130. The table-per-hierarchy coding patterns 130 may then be translated into the statements 118 that are executed to instantiate a database that may include a single table that corresponds to the generalization hierarchy 400.

FIG. 9 illustrates a table-per-hierarchy coding pattern 900, which may be translated into statements 118 that may be executed to instantiate at least a portion of a database that includes a single table that corresponds to the generalization hierarchy 400. As shown in FIG. 9, the coding pattern 900 may be written in a declarative language, such as the M language. The coding pattern 900 may include a closed enumeration 902 of the nominal classes. Properties 902, 904, 906 of the root class may be made mandatory, while properties 908, 910, 912, 914, 916 may be made optional with constraints declared over these optional properties.

Desirably, table-per-hierarchy coding patterns 130 may help avoid complexity resulting from managing multiple tables. The selection criteria 132 for table-per-class coding patterns 130 may include how simple the generalization hierarchy is. Table-per-hierarchy coding patterns 130 may work well with simple generalization hierarchies.

In one embodiment, the transformation selection and application portion 124 shown in FIG. 1 may select and apply one or more transformations 128 to the model elements 114 from the generalization hierarchy 400 to create table-per-concrete-class coding patterns 130. The table-per-concrete-class coding patterns 130 may then be translated into the statements 118 that are executed to instantiate a database 1000 shown in FIG. 10. The database 1000 may include one or more tables that correspond to the concrete classes 408, 410, 412, 414, 416 in the generalization hierarchy 400. For example, the database may include tables 1008, 1010, 1012, 1014, 1016 that correspond to the classes 408, 410, 412, 414, 416, respectively.

Figures 10, 11:
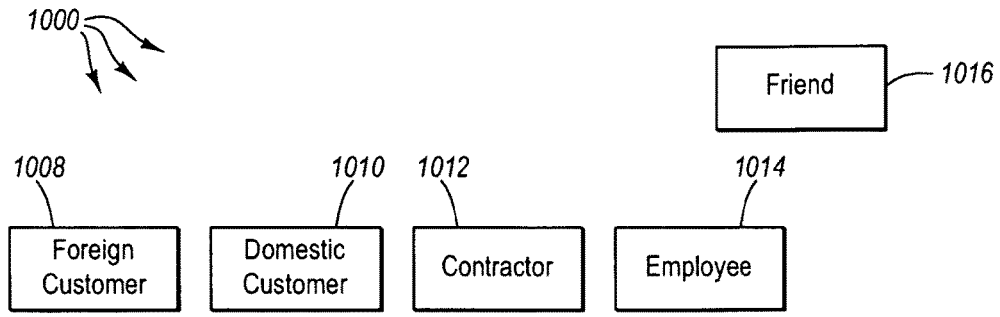
FIG. 10 is a diagram of an exemplary database based on the generalization structure shown in FIG. 4.
FIG. 11 is an illustration of an exemplary coding pattern.

FIG. 11 illustrates a table-per-concrete-class coding pattern 1100, which may be translated into statements 118 that may be executed to instantiate at least a portion of the database 1000, in particular, tables 1008, 1010. As shown in FIG. 11, the coding pattern 1100 may be written in a declarative language, such as the M language or Transact SQL (T-SQL).

Desirably, table-per-concrete-class coding patterns 130 may work well if concrete classes exist only at the leaves of the hierarchy, there are few relationships with abstract classes in the hierarchy and/or there is a low emphasis placed on queries for abstract classes. The selection criteria 132 for table-per-class coding patterns 130 may include (1) the location of the concrete classes; (2) the number of relationships with abstract classes; and/or (3) other selection criteria.

As discussed above, the transformation selection and application portion 124 may select and apply one or more transformations 128 to the model elements 114 to create one or more coding patterns 130 for a model which may include elements organized into one or more generalization hierarchies. Types of coding patterns 130 may include, for example, table-per-class coding patterns, table-per-hierarchy coding patterns, table-per-concrete-class and/or other types of coding patterns. If desired, the transformations 128 may be used to create coding patterns 130 of the same type for a whole model or generalization hierarchy. However, using a single type of coding pattern 130 for the entire model or generalization hierarchy could yield a database 106 that does not meet performance requirements. For better database performance generally, the transformations 128 may be used to create different types of coding patterns 130 for different parts of the model or generalization hierarchy. This allows the coding patterns to be tailored to the various parts of the model 104 resulting in local optimization of the database 106, which improves overall database performance.

In further detail, the transformations 128 may include one or more transform directives 134. The transformation selection and application portion 124 may select, based on predetermined selection criteria 132, various transform directives 134 for different parts of the model 104, e.g. different directives 134 for different sets of model elements 114. The predetermined selection criteria 132 may include database performance requirements, such as response-time requirements for data retrieval and/or data insertion. The transformation selection and application portion 124 may apply the selected transform directives to the different parts of the model 104 to create different types of coding patterns 130 for those different parts. Because the various transform directives 134 may be selected based on performance requirements, the database 106 may perform significantly better, for instance, with respect to response time for data retrieval and/or data insertion.

The transform directives 134 may include one or more general transform directives and/or one or more class-specific transform directives. The general transform directives 134 are configured to be applied to the model 104 as a whole. A general transform directive 134 may, for example, be configured to cause a particular coding pattern 130 to be used for the model 104 as whole. The class-specific transform directives 134 are configured to be applied to the model elements 114 on a model-element-by-model-element basis, e.g. an class-by-class basis for a generalization hierarchy. An class-specific transform directive 134 may, for example, be configured to cause a particular coding pattern 130 to be used for an class. In particular, the class-specific transform directives 134 may be configured to cause how a class in the generalization hierarchy is implemented in the tables of the database 106, for instance, whether the class is implemented in the class's own table, in a table that implements the class's super type, or in tables that implement the class's subtypes.

It will be appreciated that a general transform directive 134 could be replaced by a plurality of class-specific transform directives 134. For example, a general transform directive 134 configured to cause a table-per-class coding pattern 130 to be used for the model 104 as whole could be replaced by a plurality of class-specific transform directives 134 configured to cause each class to be implemented in the class's own table. Also, a general transform directive 134 configured to cause a table-per-hierarchy coding pattern 130 to be used for the model 104 as whole could be replaced by a plurality of class-specific transform directives 134 configured to cause each class to be implemented in a table that implements the class's super type. In addition, a general transform directive 134 configured to cause a table-per-concrete-class coding pattern 130 to be used for the model 104 as whole could be replaced by a plurality of class-specific transform directives 134 configured to cause each class to be implemented in tables that implement the class's subtypes.

The transformations 128 may include both general transform directives 134 and class-specific transform directives 134 that are applied to the model 104 and model elements 114. By using both general transform directives 134 that apply to the model 104 as a whole and class-specific transform directives 134 that apply to individual model elements 114, a fine degree of control over the transformation process is possible. This control may be used to locally optimize each part of the database schema 102 and thus significantly improve the performance of the database 106.

If desired, other transformations 128, coding patterns 130 and/or transform directives 134 may be used with other aspects of a model or generalization hierarchy based on other selection criteria 128.

For example, the model 104 may include one or more classes 136 and one or more associations 138 between the classes 136 within the model 104. An association 138 between classes 136 may define the permitted links between instances of those classes in an instantiation of the model 104. An association 138 may, for example, define the number of instances of the classes that may be at each end of the association. Exemplary associations 138 may include, but are not limited to, one-to-one associations, one-to-many associations, and many-to-many associations. A one-to-one association 138 allows only one instance of each class to be linked to each other, a one-to-many association allows one instance of one class to be linked to many instances of the other class, and a many-to-many association allows many instances of each class to be linked to each other.

The transformation selection and application portion 124 may select, based on predetermined selection criteria 132, transform directives 134 for the associations 138 and then may apply the selected transform directives to the associations 138 to create coding patterns 130. The coding patterns 130 derived from the associations may yield (e.g. via their translation into statements 118 that are then executed) references between tables in the database 106 and/or additional tables in the database 106.

In further detail, the transformation selection and application portion 124 may select a transformation 128 for an association 138 based on predetermined selection criteria 132 that include the association's type. For a one-to-many association 138, the selected transformation 128 may be used to create a coding pattern 130 that yields, in the table of the class that can participate many times, a reference to the instance of the class that can participate only once. For a one-to-one association 138 that's defined as a composite aggregation association, the selected transformation 128 may be used to create a coding pattern 130 that yields, in the table of the class defined as the part, a reference to the instance of the class defined as the composite. For a one-to-one association 138 that's defined as navigable in only one direction, the selected transformation 128 may be used to create a coding pattern 130 that yields, in the table of the class at the non-navigable end, a reference to the instance of the class at the navigable end. For a many-to-many association 138, the selected transformation 128 may be used to create a coding pattern 130 that yields a new table for the association.

The coding pattern 130 that implements an association 138 between classes 136 interplays with the coding pattern 130 that implements the classes. In particular, the references that express the association should be implemented in (and refer to) the table or tables in which the associated classes are implemented, such that, for example, a reference to an class that has been implemented in the tables of its subtypes should have a mutually exclusive reference to each table in which the class has been implemented.

In addition to determining the direction in which a reference extends and/or where the reference is implemented, the transformations 128 may be used to create a coding pattern 130 that determines the reference's reference type. The transformation selection and application portion 124 may select the transformation 128 based on predetermined selection criteria 132, such as attributes of the model 104. Exemplary types of references include, but are not limited to, a normal "Reference," an "Untyped Reference" or a "Named Reference."

A normal Reference uses a field in the referencing table in which the identifier of the referenced instance is stored. A database management system hosting the database 106 may be configured to ensure that an instance exists with that identifier value and that the normal Reference refers to an instance in a specified table.

An Untyped Reference uses a field in which the identifier of the referenced instance is held but does not require that the instance's table is specified. For an Untyped Reference, a common identification scheme may be used for each class that may be targeted by the reference to ensure that the identifier in those tables is unique across all tables. For database management systems that do not support Untyped References, the transformation 128 may be used to create additional coding patterns 130 to ensure that the references are valid/unique.

A Named Reference uses a text field in which an identifying text string is stored. Such a text string enables software using the database to retrieve an instance of the target class. Such references are not normally based on the formal database identifier but some other unique property or properties such as a delimited compound name formed from the name of the target class prefixed by the name of the package or other context in which it is defined. Such references are useful if the reference may be resolved to different versions of the target or if the target may for some reason not be present.

In addition to determining the particular kind of reference, some transformations 128 may be used to influence other association-related transformations 128. For example, for a one-to-one association, a transform directive 134 may be used to override which class end holds the association. For a one-to-one association or a one-to-many association, a transform directive 134 may be used to require that, to implement the association, an association table be created to include references from the association table to the tables used to implement the participating classes. A threshold value can be set to indicate, when multiple references are required because of the target class implementation, the maximum number of normal References to allow before using Untyped references. For some or all of the associations, a transform directive 134 can be used to indicate if a normal Reference, an Untyped Reference or a Named Reference should be used to implement the reference.

The transformations 128 may be used to create not only tables in the database 106, but also views of those tables. In particular, the transformation selection and application portion 124 may select transform directives 134 for the model elements 114 and then may apply the selected transform directives 134 to the model elements 114 to create coding patterns 130 that yield tables and views of those tables in the database 106. The coding patterns 130 may include, for example, a set of view definitions, expressed in declarative language code.

The view definitions may include a view definition for each class that enables retrieving, inserting, updating and/or deleting of instances of that class by applications. Desirably, the transform selection/application 124 ensures that, regardless of the directives and the resulting coding patterns 130 chosen for classes and associations, the externally exposed aspects of the views are unchanged and enforces that insertion is only allowed using views of concrete classes. Such a set of views allows application programs to be written to access and manage the data in a database and to be insulated from the differences between the coding patterns 130. Desirably this allows the transform selection/application 124 to be run repeatedly with modified transform directives 134 to produce different output without requiring the code of applications using the database 106 to be changed. This allows the design and performance of the resulting database 106 to be changed and tuned over time without changing the application programs' code. Experienced practitioners will recognize that this system's ability to tune performance without changing the application programs' code has great value.

If desired, the transformations 128 and/or the transform directives 134 may be saved and used repeatedly or copied to enable modifications to be made. Desirably this allows different databases 106 for the same model to be produced at low cost and used experimentally to determine the optimum database schema 102 to use as an implementation of the model 104 for specific applications or as data volumes or application access patterns change over time.

Transform Directives

As shown above, the transformations 128 may include a variety of transform directives 134. The transform directives 134 may include, but are not limited to, general transform directives that apply to the model 104 as a whole, specific directives that apply to individual model elements 114, and/or other types of transform directives. In some embodiments, the specific transform directives 134 may include package transform directives, class transform directives, attribute transform directives, association transform directives, and/or association-end transform directives. Some exemplary transform directives 134 are listed below.

Exemplary General Transform Directives

An "Implementation" general transform directive may be configured to indicate a default coding pattern approach (e.g., table-per-class, table-per-hierarchy, table-per-concrete-class, etc.) taken for all classes in the model 104 unless overridden by another directive, such as a class transform directive. Table-per-class may be equivalent to setting Class.Implementation="InExtent" on every class; table-per-hierarchy may be equivalent to setting Class.Implementation="InSupertype" on every class except root classes on which Class.Implementation="InExtent" (root classes are classes with no supertype); and table-per-concrete-class may be equivalent to setting Class.Implementation="InExtent" on every concrete class and Class.Implementation="InSubtypes" on every abstract class. Table-per-concrete-class or a different strategy may be a default strategy.

A "GenerateTypesForAllClasses" general transform directive may be configured to indicate (when set to true) that an M type should be generated for every class in the source model and extents may include these M types in their definition. In the M language, the notion of extent equates to a table, and a type in M describes a simple data structure that may be included as part of the definition of an extent and may be used to describe the returned data structure of a view. In addition, in the M language, types may include other types by reference, extents may include types by reference, and views may be typed by reference to a type. When the "GenerateTypesForAllClasses" general transform directive is set to false, extents may be defined by including the equivalent fields and references inline without reuse of definitions in the model 104. The "GenerateTypesForAllClasses" general transform directive may be equivalent to GenerateType=true on each class.

A "GenerateAbstractTypeViews" general transform directive may be configured to indicate that views should be generated for all abstract types in the model.

A "GenerateNavigationFunctionsForAllAssociations" general transform directive may be configured to indicate (when set to true) that navigation functions should be generated for all associations. A navigation function may take an identifier of an instance that participates in the association and returns the set of related instances. With a many to many association the function may compute the set based on instances in the intersection extent. Where appropriate these functions may traverse intermediate extents added for association resolution.

A "GenerateNavigationFunctionsForManyManyAssociations" general transform directive may be configured to indicate (when set to true) that navigation functions should be generated for just many-to-many associations. The "GenerateNavigationFunctionsForManyManyAssociations" general transform directive may ignored when the "GenerateNavigationFunctionsForAllAssociations" general transform directive is set to true.

A "ExplicitExtentReferences" general transform directive may be configured to indicate (when set to true) that references are expressed using the target extent and (when set to false) indicates references are expressed using a target type if available and a membership constraint is used on an extent that includes the type to bind the reference to a target extent.

A "UntypedReferenceThreshold" general transform directive may be configured to be used when implementing a reference to a class that is implemented in its subtypes. If the number of individual subtypes and thus the number of references required exceeds the threshold value defined by the "UntypedReferenceThreshold" general transform directive, a single untyped reference is used instead of individual strongly typed references. Individual associations can still be implemented using untyped references by setting an UntypedReference directive on an association end.

A "DiscriminatorLabel" general transform directive may be configured to be used to name discriminator fields in discriminated union types/extents.

A "UseDiscriminatorLabelAsSuffix" general transform directive may be configured to indicate (when set to true) that the Discriminator label is used as a suffix to the discriminated class name to form the discriminator field name, e.g. on the class Person, with the discriminator label "Kind", the discriminator would be "PersonKind." When the "UseDiscriminatorLabelAsSuffix" general transform directive is set to false, the discriminator label alone is used as the discriminator field name.

An "ExtentNamePluralized" general transform directive may be configured to indicate (when set to true) the class name should be pluralized to form the extent name.

An "ExtentSuffix" general transform directive may be configured to provide a suffix to be used on the class name to form an extent name.

A "ViewNamePluralized" general transform directive may be configured to indicate (when set to true) the class name should be pluralized to form the view name.

An "ViewSuffix" general transform directive may be configured to provide a suffix to be used on the class name to form a view name.

An "TypeSuffix" general transform directive may be configured to provide a suffix to be used on the class name to form the type name.

While the above-listed general transform directives may be suited to the M language, the coding patterns 130 may be created in other declarative languages and/or other types of languages. It will be appreciated that the above-listed general transform directives are merely examples and that general transform directives need not include any of these examples. It will also be appreciated that general transform directives themselves are not required.

Exemplary Package Transform Directives

A "PackageName" package transform directive may be configured to provide the name of the package to which this directive applies.

A "ModuleName" package transform directive may be configured to provide the name of the M module that should be created to implement elements in this package.

An "Ignore" general transform directive may be configured to indicate (when set to true) the package and all its content is ignored completely as input to the transformation.

While the above-listed package transform directives may be suited to the M language, the coding patterns 130 may be created in other declarative languages and/or other types of languages. It will be appreciated that the above-listed package transform directives are merely examples and that package transform directives need not include any of these examples. It will also be appreciated that package transform directives themselves are not required.

Exemplary Class Transform Directives

A "ClassName" class transform directive may be configured to provide name of the class to which this directive applies.

An "Ignore" class transform directive that, when set to true, the class is ignored completely as input to the transformation.

An "Implementation" class transform directive that may be set to various values (such as, "InExtent", "InSupertype", "InSubtypes", "InExtentAndSubtypes") to indicate how to implement a class with respect to the classes it specializes or that specialize it. This class transform directive may advantageously override the "Implementation" general transform directive for a specific class. When the "Implementation" class transform directive is set to "InExtent," an extent is generated for the class, which is the default for a concrete class. When the "Implementation" class transform directive is set to "InSupertype," the class is implemented according to the implementation directive applicable to its supertype. When the "Implementation" class transform directive is set to "InSubtypes," the features of the class are implemented in each of its subtypes according to the implementation directive applicable to each subtype, which is the default for an abstract class. When the "Implementation" class transform directive is set to "InExtentAndSubtypes" (which is typically used for concrete classes), the concrete class is implemented as an extent while the features of the class are also implemented on each subtype, instances of the class and subtypes are stored separately, and instances of the subtypes do not result in an instance of the class in the class extent.

An "ImplementationSupertype" class transform directive may be configured such that, if the class has multiple supertypes and the InSupertype implementation directive is specified, then the ImplementationSupertype directive is used to indicate in which of the supertypes the class should be implemented.

An "ExtentName" class transform directive may be configured to provide a name of the extent and may be used if an extent is produced for the class. If a name is not provided a default extent name algorithm may be used.

A "GenerateView" class transform may be configured to indicate (when set to true) that a computed value (view) should be generated for an abstract class. The view may allow update and delete for all classes and insert for concrete classes. The "GenerateView" class transform directive may be ignored if the class is concrete (IsAbstract=false) because a concrete class should always have a view generated to allow insert.

A "ViewName" class transform may be configured to provide an optional name of the view and may be used if a view is produced for the class.

A "GenerateType" class transform may be configured to generate a single type in M for the class. The type may contain fields for the local properties of the type. The "GenerateType" class transform may not have an equivalent in SQL.

A "TypeName" class transform directive may be configured to provide an optional name of the type and may be used if an M type is created for the class.

A "GenerateExtentType" class transform directive may be configured to cause a type that represents the full definition of the extent to be generated and may provide an explicit type that can be referenced in M expressions. The "GenerateExtentType" class transform directive is valid where Implementation="InExtent."

An "ExtentTypeName" class transform directive may be configured to provide an optional name of the extent type and may be used if an extent type is produced for the class.

A "DiscriminatorLabel" class transform may be configured to name the discriminator field in discriminated union types/extents.

A "UseDiscriminatorLabelAsSuffix" class transform may be configured to indicate (when set to true) that the Discriminator label is used as a suffix to the discriminated class name to form the discriminator field name. When the "UseDiscriminatorLabelAsSuffix" class transform is set to false, the discriminator label alone is used as the discriminator field name.

A "Folder" class transform directive may be configured to provide the folder in which code generated for this class should be included and may be used to group code created for related classes/associations.

While the above-listed class transform directives may be suited to the M language, the coding patterns 130 may be created in other declarative languages and/or other types of languages. It will be appreciated that the above-listed class transform directives are merely examples and that class transform directives need not include any of these examples. It will also be appreciated that class transform directives themselves are not required.

Exemplary Attribute Transform Directives

A "PropertyName" attribute transform directive may be configured to provide the name of the property to which this directive applies.

An "Ignore" attribute transform directive may, if true, cause the property to be ignored in the transformation.

A "FieldName" attribute transform directive may be configured to provide a name of the field to be used instead of computing the name from the property name.

A "MType" attribute transform directive may be configured to provide a type name to be used in the generated M as the type of the field to override the default mapping of the attribute's type to an M type provided by the transformation.

An "EnforceNonNullWithConsistencyCheck" attribute transform directive may be configured to (when set to true) cause a mandatory property to be implemented as an optional field which will result in a nullable column with the requirement for a non-null value enforced using a consistency check function. The declarative language coding statements for the consistency check function are generated by the transformation but the function will not be invoked automatically during insert or update of data in the database.

While the above-listed attribute transform directives may be suited to the M language, the coding patterns 130 may be created in other declarative languages and/or other types of languages. It will be appreciated that the above-listed attribute transform directives are merely examples and that attribute transform directives need not include any of these examples. It will also be appreciated that attribute transform directives themselves are not required.

Exemplary Association Transform Directives

An "Ignore" association transform directive may be configured to (when set to true) the association and its association ends to be ignored in the transformation.

An "Implementation" association transform directive that may be set to various values (such as, "AsExtent", "AsReference") to determine how the association is implement. When the "Implementation" association transform directive is set to "AsExtent," the association is implemented as an extent with references to the types/extents being associated. (This directive may ignored for many-to-many binary associations and n-ary associations which are typically always implemented using an extent.) The "Implementation" association transform directive may be set to "AsReference" as the default for one-to-one and many-to-many associations.

An "ExtentName" association transform directive may be configured to provide the name of the extent to be created to implement the association. The "ExtentName" association transform directive is valid where the association is being implemented as an extent.

While the above-listed association transform directives may be suited to the M language, the coding patterns 130 may be created in other declarative languages and/or other types of languages. It will be appreciated that the above-listed attribute association directives are merely examples and that association transform directives need not include any of these examples. It will also be appreciated that association transform directives themselves are not required.

Exemplary Association-End Transform Directives

Association-end transform directives may influence transformation of a property that acts as an association end. The property type may determine the end of the association. If implemented as a reference in a binary association, the reference is from the extent that implements the other end of the association.

A "PropertyName" association-end transform directive may be configured to provide the name of the property to which this directive applies.

A "ReferenceName" association-end transform directive may be configured to provide the name used for the reference; if provided overrides the property name. This is typically only used if the association end is the source of the reference.

An "Implementation" association-end transform directive may be set to various values (such as, "AsReference", "AsUntypedReference", "AsUri") to indicate how the association should be implemented.

When the "Implementation" association-end transform directive is set to "AsReference," it indicates this association property should be implemented as an M reference. This may be used on a one-to-one association to define which property is implemented as the reference to override the default selection. Typically, this may only be set on one end of a binary association.

When the "Implementation" association-end transform directive is set to "AsUntypedReference," it indicates the association should be implemented by an untyped reference from this end. An untyped reference is normally used to express a reference to an abstract type to enable polymorphic behavior—the reference can be to one of many concrete subtypes of the referenced class. The generated reference is bound by a constraint to an abstract view. Such a reference typically does not result in a foreign key constraint in SQL, so additional constraint triggers may be required to enforce referential integrity. This may be used if the reference is to a class with an Implementation directive "InSubtypes." This typically can only be set on one end of a binary association.

When the "Implementation" association-end transform directive is set to "AsUri," it indicates the reference should be implemented using a URI-based reference. A Text field is generated in which an identifying value is stored. This could be extended to enable a strongly typed URI scheme.

A "GenerateNavigationFunction" association-end transform directive may be configured generate a computed value (function) that returns for a given class instance the linked instances of this property.

A "DeleteAction" association-end transform directive may be configured to indicate the action that should occur if an instance of the owning class is deleted.

An "EnforceNonNullWithConsistencyCheck" association-end transform directive may be configured to cause (when set to true) a mandatory reference to be implemented as optional. The model requirement for a non-null reference may be verified by a consistency check function. The declarative language coding statements for the consistency check function are generated by the transformation but the function will not be invoked automatically during insert or update of data in the database.

While the above-listed association-end transform directives may be suited to the M language, the coding patterns 130 may be created in other declarative languages and/or other types of languages. It will be appreciated that the above-listed attribute association-end directives are merely examples and that association-end transform directives need not include any of these examples. It will also be appreciated that association-end transform directives themselves are not required.

As discussed above, the transformation selection and application portion 124 may be configured to apply transformations 128 to extracted model elements 114 to create coding patterns that are translated into statements 118. If desired, the transformation selection and application portion 124 may be configured to apply transformations 128 to extracted model elements 114 to create the statements 118 directly. Thus, the coding patterns 130, while a convenient intermediate, are not required and the transformations 128 may be configured to yield the statements 118 directly.

As shown above, various embodiments of the invention may provide a system and method for transforming an information or conceptual model expressed using classes or entity types, where the classes may be organized into generalization structures and may be described by attributes and associations, into a database design. Accordingly, a simple set of directives can be provided as input which guides the transformation and indicates what patterns of tables should be created by the transformation. If desired, regardless of the directives chosen, a set of views may be created that projects a query interface to the database that closely reflects the input model with a view for each class.

The process may be configured to ensure that the implementation of the views takes account of the directives used so that radically different database designs can be created but still be accessed through views that appear to the user to be unchanged. Importantly, the directives may allow both coarse-grained and fine-grained control of the database design, with decisions made for the model as a whole and on a class-by-class basis as to which patterns should be used. This fine grain control allows the overall design of a database to be optimized by optimizing parts of the database as required. Furthermore, the database can be generated repeatedly during application development using different directives or a changed model to allow experimentation with different designs in order to determine an optimal final design. This will be particularly valuable to experienced practitioners in database design and developers of software applications that access databases.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method executed by one or more processors of a computing system, the method for instantiating a database having a database schema corresponding to a unified modeling language (UML) specification, the method comprising:
    extracting at least one model element from a unified modeling language (UML) specification, the unified modeling language (UML) specification being defined by a first model comprising a plurality of model elements, the plurality of model elements of the first model being usable to describe software system structure, software system behavior, and software system architecture for one or more particular software systems;
    generating a first set of one or more declarative language coding patterns based on first predetermined criteria and the at least one model element, the declarative language coding patterns defining a database having a database schema representing the first model and the at least one model element;
    translating the generated first set of one or more declarative language coding patterns into a first set of one or more Structured Query Language (SQL) statements that when executed, can instantiate at least a portion of a database having the database schema representing the first model and the at least one model element; and
    instantiating within a data storage system, by executing the first set of one or more SQL statements, the at least a portion of the database having the database schema representing the first model and the at least one model element of the unified modeling language (UML) specification.

2. The method as in claim 1, wherein the first predetermined criteria comprises a plurality of transform directives.

3. The method as in claim 2, wherein the plurality of transform directives include at least one general transform directive and at least one class-specific transform directive.

4. The method as in claim 1, wherein the model includes a set of classes; wherein the first database includes a first set of tables and a first set of views of the first set of tables; and wherein the first set of views correspond to the set of classes in the model.

5. The method as in claim 4, further comprising:
    generating a second set of one or more declarative language coding patterns based on second predetermined criteria and the at least one model element;
    translating the generated second set of one or more declarative language coding patterns into a second set of one or more Structured Query Language (SQL) statements; and
    instantiating at least a portion of a second database by executing the second set of one or more SQL statements;
    wherein the second database includes a second set of tables and a second set of views of the second set of tables; wherein the second set of views correspond to the set of classes in the model; wherein the first and second sets of tables are different; and wherein the first and second sets of views are interchangeable.

6. The method as in claim 5, wherein the first predetermined criteria comprises a set of transform directives; and wherein the second predetermined criteria comprises a different set of transform directives.

7. The method as in claim 5, wherein the first model comprises a generalization structure that includes the at least one model element.

8. The method as in claim 5, wherein the declarative-language comprises the M language.

9. The method as in claim 1, wherein the first model comprises a generalization structure that includes the at least one model element.

10. The method as in claim 1, wherein the declarative-language comprises the M language.

11. A system enabling instantiating a database having a database schema corresponding to a unified modeling language (UML) specification, the system comprising:

one or more computer processors; and one or more physical computer-readable storage devices having stored thereon computer-executable instructions that, when executed by the one or more computer processors, cause the system to perform a method, the method including:

extracting a plurality of model elements from a unified modeling language (UML) specification, the unified modeling language (UML) specification being defined by a first model comprising a plurality of model elements that defines the unified modeling language (UML) specification, the first model being usable to define software system structure, software system behavior, and software system architecture for one or more particular software systems;

generating at least one declarative-language coding pattern based on a plurality of transform directives, the declarative language coding pattern defining at least a portion of a database having a database schema representing the plurality of model elements defining the UML specification;

translating the generated at least one declarative-language coding pattern into at least one Structured Query Language (SQL) statement that, when executed, can instantiate at least a portion of a database having a database schema representing the plurality of model elements defining the UML specification; and instantiating within a data storage system, by executing the first set of one or more SQL statements, the at least a portion of a relational database having a database schema representing the plurality of model elements defining the UML specification.

12. The system as in claim 11, wherein the first model defines a modeling language specification; and wherein the method further includes storing, in the relational database, data representing a second model that complies with the modeling language specification, the second model configured to describe software system artifacts.

13. The system as in claim 12, wherein the method further includes retrieving the data from the database and using the retrieved data to render, on a display device, at least a portion of the second model.

14. The system as in claim 11, wherein the plurality of transform directives include at least one general transform directive applied to the first model as a whole and at least one class-specific transform directive applied to at least one of the plurality of model elements.

15. The system as in claim 11, wherein the model includes a generalization structure, the plurality of model elements forming at least a part of the generalization structure.

16. The system as in claim 11, wherein the method further includes the computing system including the one or more processors.

17. A method for instantiating a database having a database schema corresponding to a unified modeling language (UML) specification, the method executed by one or more processors of a computing system, the method comprising:

extracting a plurality of model elements from a unified modeling language (UML) specification, the unified modeling language (UML) specification being defined by a first model that includes a generalization structure, the first model enabling description of software system structure, software system behavior, and software system architecture for one or more particular software systems;

generating at least one declarative-language coding pattern based on at least one general transform directive applied to the first model and at least one class-specific transform directive applied to at least one of the plurality of model elements, the declarative-language coding pattern for instantiating a database having a database schema representing the first model and the plurality of model elements;

translating the generated at least one declarative-language coding pattern into at least one Structured Query Language (SQL) statement that, when executed, can instantiate at least a portion of a database having a database schema representing the plurality of model elements defining the UML specification; and instantiating within a data storage system, by executing the at least one SQL statement, at least a portion of a relational database having a schema representing the plurality of model elements defining the UML specification.

18. The method as in claim 17, further comprising storing, in the relational database, data representing a second model that complies with the modeling language specification, the second model configured to describe software system artifacts.

19. The method as in claim 18, further comprising retrieving the data from the database and using the retrieved data to render, on a display device, at least a portion of the second model.

* * * * *